July 14, 1925.  
F. A. STEVENS  
OPHTHALMIC MOUNTING  
Filed July 1, 1922  
1,545,529

Inventor;-
Frederick A. Stevens.
David Rines
Attorney;-

Patented July 14, 1925.

1,545,529

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed July 1, 1922. Serial No. 572,155.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings comprising endless lens-holding rims, and more particularly to mountings of the all-"shell" type, constituted of non-metallic material, like celluloid, zylonite and the like.

As the non-metallic material, though more or less resilient, is not sufficiently so to permit mounting lenses within the endless rims at ordinary temperatures, it is necessary to apply heat, which permits of stretching or expanding the rims to increase temporarily their calibre. This is a drawback, for besides the inconvenience attending the heat application, the mounting may become distorted in consequence; in fact, it frequently cracks as a result.

In a copending application, Serial No. 479,480, filed June 22, 1921, there is disclosed and claimed an ophthalmic mounting within the endless rims of which lenses may be tightly, non-rotatably mounted without the necessity of previously expanding or stretching the non-metallic material. The lens-receiving grooves are each provided, on one side, with a wall against which the lens is adapted to rest, the other side of the groove being cut away, or open. This makes it possible to insert within the groove, by way of the open side, a lens of diameter substantially equal to the calibre of the groove. Small clips, that are preferably integral with the body of the mounting, are provided at the open side of the groove to prevent the lens falling out of the groove. In the preferred construction, one clip is provided near the temple end piece, and another near the bridge, though the number, the location and the dimension of the clips may be varied as desired. When integral clips are employed, it is necessary to move one or more of them temporarily aside to permit inserting the lens. This may be effected by temporarily bending or springing back the portion of the rim near the temple end piece, for example, a little out of its plane. The bending or springing is rendered possible by the resilient character of the material of which the mounting is constituted.

The invention of the present application is an improvement upon that disclosed in a continuation of the aforesaid application.

Figure 1:
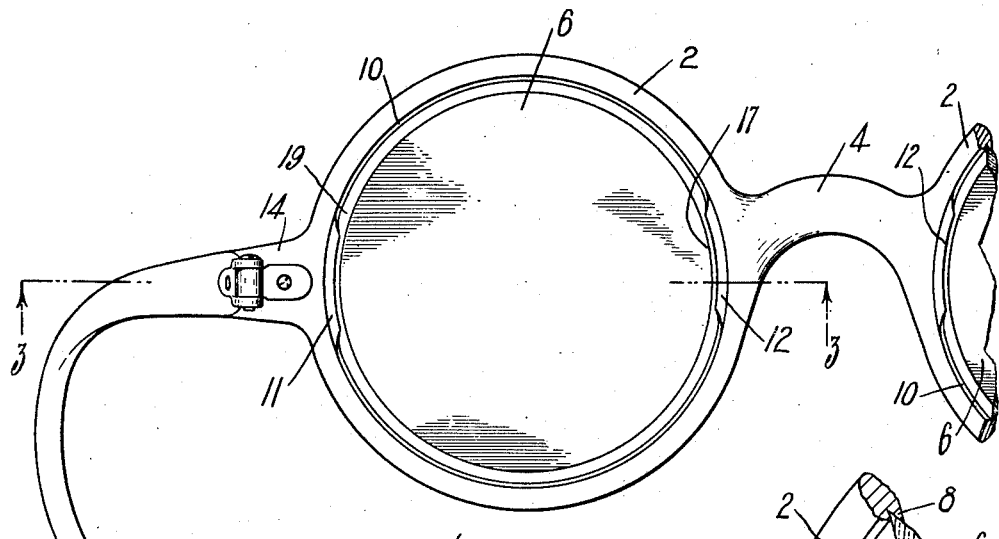
Figure 2:
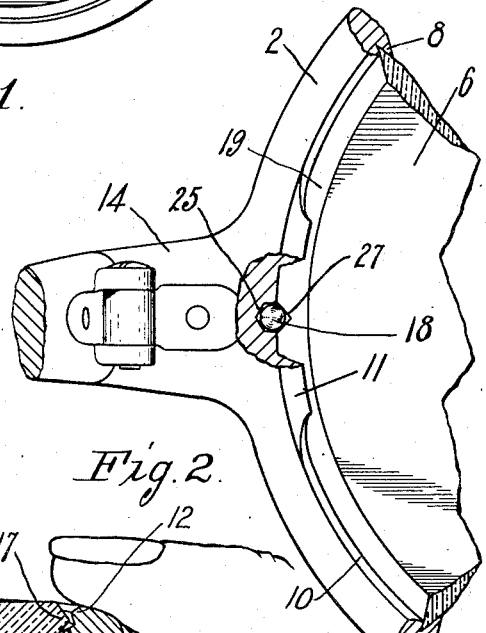
Figure 3:
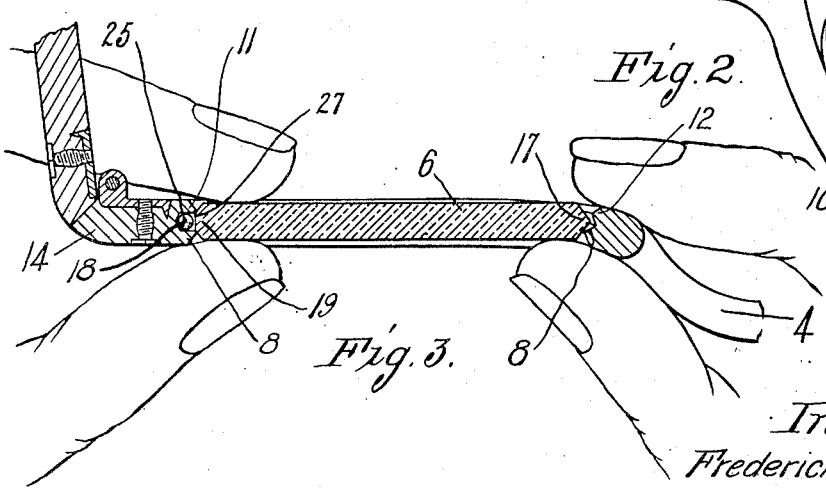

In the accompanying drawings, Fig. 1 is a rear elevation of a portion of a spectacle mounting constructed according to a preferred embodiment of the present invention; Fig. 2 is a similar view of the same, with parts broken away; and Fig. 3 is a section taken upon the line 3—3 of Fig. 1, illustrating the act of inserting a lens in its lens groove.

Ophthalmic mountings of the above-described character, constituted of non-metallic material, like celluloid, zylonite and the like comprise two endless rims 2 integrally connected together by a bridge 4, and each having integral temple end pieces 14. The bridge and the end pieces need not, however, be integral. They may be made of metal or other material and they may be attached to the rims in any well-known manner.

The lens-receiving grooves are each provided on one side with a wall 8, against which the lens 6 is adapted to rest, the other side of the groove being cut away, or open, as shown at 10. This makes it possible to insert within the groove, by way of the open side 10, a lens of diameter substantially equal to the calibre of the groove. One or more clips are provided at the open side of the groove to prevent the lens falling out of the groove. A clip 11 is shown provided near the temple end piece, and a clip 12 near the bridge, but it will be understood that the number, the location and the dimension of the clips may be varied as desired.

The clips are shown integral with the body of the mounting, but they may be separable and they may be constituted of metal or any other desired material. Separable clips may be preferred if the rims are made of metal, and the use of such is considered to be within the scope of the present invention. When separable clips are employed, they may be removed, and replaced after the lens has become seated in its groove. If integral clips such as are shown are employed, it is necessary to move one or more of them, as the clip 12, temporarily aside to permit inserting the lens. This may be effected by temporarily bending or springing back the portion of the rim 2 near the bridge 4, for example, a little out of its plane, as is illustrated in Fig. 3. The bending or springing is rendered possible by the resilient character of the material of which the mounting is constituted. To supply the necessary leverage for the bending or springing action, the temple end piece and the bridge may be grasped, one in each hand, as is illustrated in Fig. 3.

One side 19 of the lens is then placed in position between the other clip 11 and the portion of the wall 8 of the lens groove near the temple end piece 14, and the portion of the rim near the bridge 4 may be allowed to spring or snap back into its plane, into position over the opposite side 17 of the lens, with the clip 12 over the edge 17 of the lens. The lens is thus readily and conveniently mounted within its groove, and is retained within its groove by the wall 8 engaging one of its faces, and the clips engaging the other face.

As it is unnecessary to distort the rims by heat or otherwise, the mounting will permanently retain its original shape, so that when a properly shaped lens is once properly fitted into a groove of proper size and shape, it will remain properly fitted, neither too loose nor too tight. The dangers of accidental axial derangement of the lens within its groove, caused by the lens being too loose, and of the rim cracking, caused by the lens being too tight in its groove, are thus eliminated.

It is not essential that the side 10 of the lens-receiving groove be completely cut away. It is sufficient that the calibre of the groove at the side 10 be larger than the smallest calibre of the wall 8, but not too small to admit entry of the lens.

According to the above-described invention, lenses of special construction are preferably employed, each provided with notches within which the clips are adapted to enter to prevent rotation of the lenses within the grooves in which they are seated. This is necessary only in case the lens is cut of too small diameter, no rotation-preventing means being required if the lens is properly fitted to the calibre of the rim.

It is preferred, however, to use removable locking members, like lead balls 18. The lens receiving groove is therefore provided with a notch 25 that extends but part way through the thickness of the rim, and the periphery of the lens is provided with a registering notch 27. The locking ball engages the walls of the notches 25 and 27 to lock the lens against rotation in its groove, and is freely separable or removable from both the rim and the lens.

It will be understood that the invention is not restricted to the exact embodiment thereof that is illustrated in the accompanying drawings and described herein, and that all modifications within the skill of the artisan are considered to be within the spirit and scope of the present invention, as defined in the appended claims.

What is claimed as new is:

1. An ophthalmic mounting comprising an endless rim constituted of non-metallic material that is adapted to be expanded by heat and having a lens-receiving groove provided with a notch that extends but part way through the thickness of the rim and that is adapted to removably receive a locking member that is freely separable from the rim, the locking member being adapted to lie also in a registering notch of a lens that is adapted to be received in the groove, and the locking member being adapted to engage the walls of both notches to lock the lens against rotation in the groove.

2. An ophthalmic mounting as defined in claim 1 in which the lens-receiving groove is provided on one side with a wall against which the lens is adapted to rest, the lens-receiving groove being open at the side opposite to the wall, and a clip provided at the side opposite to the wall being adapted to engage the lens when the latter is seated in the groove.

3. An ophthalmic mounting comprising an endless rim constituted of non-metallic material having a bridge and a temple end piece and a lens-receiving groove provided on one side with a wall against which the lens is adapted to rest, the lens-receiving groove being open at the side opposite to the wall, and clips being provided at said other side of the groove near the temple end piece and near the bridge, the lens-receiving groove being provided with a notch adapted to receive a ball for locking a lens against rotation in the groove.

In testimony thereof, I have hereunto subscribed my name this 27th day of June, 1922.

FREDERICK A. STEVENS.